Patented July 9, 1935

2,007,633

UNITED STATES PATENT OFFICE 2,007,633

COMPOSITIONS OF ANIMAL PROTEINS OF HIGH MOLECULAR WEIGHT AND PROCESS OF PRODUCING SAME

Oskar Bornhauser, Frankfort-on-the-Main, Germany, assignor to Heberlein & Co., A. G., Wattwil, Switzerland, a corporation of Switzerland No Drawing. Application January 29, 1929, Serial No. 336,015. In Germany February 20, 1928

7 Claims. (Cl. 106—38)

This invention relates to compositions of animal proteins of high molecular weight, and process of producing same. The composition in one form is especially useful as a spinning solution for artificial silk.

Experiments have heretofore been made to produce spinning solutions from proteins. These attempts started either with relatively soluble substances of low molecular weight such as gelatin, casein and the like; or with difficultly soluble substances of high molecular weight such as wool or silk substances dissolved in an energetic solvent, which caused the large molecule to decompose extensively. In both cases it was possible to obtain only extremely inferior spinning solutions, which could not be used to produce serviceable spun products, since the latter were lacking in strength and resistance to water and their practical use was out of the question.

This invention accordingly has for an object to provide marketable animal protein threads and other articles, and solutions for their production.

It has been discovered that the desired products, and especially spinning solutions of high value, can be obtained through the method of swelling proteins of high molecular weight and simultaneously or subsequently dissolving them in a suitable solvent for the purpose, such for example as a phenol. In cases where the high molecular weight proteins and the conditions under which same are treated, are such that the solvent will act to sufficiently swell the molecules as well as to dissolve same, it will not ordinarily be necessary to use a swelling agent other than the dissolving agent. For example, a slow acting solvent like phenol which under certain conditions can act to swell and dissolve the proteins without decomposing the same, may be employed.

The invention comprises the method and the products. In connection with the swelling of such proteins it will be noted that these substances can be dissolved in phenols without swelling, but in such cases solution occurs at temperatures over 100° C. and always with the formation of decomposed dark-colored products.

The desired swelling may be produced by treatment with hot water at ordinary pressure. If necessary higher temperature and pressure may be employed. If insufficient swelling is obtained in this way acid may be added to the water to increase it. The quantity of acid used should be such that the protein is not decomposed appreciably by it. The swelled mass can be dissolved in liquid phenol to form a viscous liquid. If it happens that the protein swells sufficiently in phenol, the preliminary swelling by some other agent is dispensed with. The swelling and dissolving are then carried out in one operation. Solution can be quickened by heating, but the heating should be such as to avoid decomposition of the protein.

The phenols, their homologues and derivatives may be employed, either by themselves singly or mixed, if necessary, with the addition of a little water to liquefy them. The phenol or mixture selected should be of low melting point or should be capable of liquefaction at a temperature below the decomposition point of the protein.

The process may be applied to any desired difficultly soluble animal protein of high molecular weight, for example to horn, hide, flesh, fish scrap, wool waste, silk waste and the like. From the resultant protein solutions artificial silk fibres substantially identical with the natural fibres are produced either by the known wet or dry spinning process. Other artificial substances such as films and other plastic shapes are obtainable by a suitable manner of coagulation.

Having thus described the invention, examples are given below of some present preferred procedures for carrying it out. It will be understood that these examples are to be construed simply as illustrations of the invention, and not in a limiting sense.

EXAMPLES OF PROCEDURE

Example 1

1000 gms. of horn shavings are gently heated in 2000 cc. of water containing 4 gms. of salicylic acid at a temperature of about 90° C. for 6 hours, when the shavings will have become swollen and softened. After draining, the swollen softened shavings are introduced into about 10 kgs. of liquefied phenol $C_6H_5OH$ containing approximately 800 gms. of water. In preparing the liquefied phenol the water used for liquefaction must be sufficient so that the liquefied phenol does not tend to take moisture from the moistened horn shavings. The horn shavings are left in the phenol solution until the water with which they are swollen is replaced by the phenol solution, which will occur in about 12 hours. The swelling process may be repeated several times by adding 1000 gms. of water to the phenol and shavings mixture, and heating to 75°

C. for 6 hours after each addition. These heatings ultimately swell the shavings so that they dissolve in the phenol. In heating the temperature should be below the point of decomposition of the proteins, i. e. below 100° C. as carried out above.

When complete solution has occurred the added water is removed by evaporation, this being prolonged until the quantity of water is still just sufficient to keep all of the phenol liquid, approximately 800 gms.

*Example 2*

1000 gms. of animal hide waste containing the natural moisture is heated to 40° C. for 12 hours with about 5000 gms. of crystallized phenol $C_6H_5OH$. If the waste is dry the phenol is liquefied by adding to it 400 gms. of water. The mixture is then saturated with gaseous sulphurous acid. The waste dissolves with noticeable simultaneous swelling. Water that evaporates during the process is replaced preferably by using a reflux condenser.

The above solutions so prepared form spinning solutions. From them commercial artificial silk fibres having strength, resistance to water, lustre, and other usual characteristics of natural silk have been prepared.

Where in the appended claims I use the expression "a phenol" or "phenol" I wish to be understood as including In the appended claims, the references to "previously swollen animal protein" shall be understood as defining natural protein material containing enough moisture to cause it to be at least partially swollen, or dry protein material which has been treated with moisture to produce swelling to a desired degree.

While I have described my invention in detail with respect to certain present preferred methods of carrying out same and preferred embodiments of the invention, I do not desire to be limited to such details since, as will be understood by those skilled in the art after understanding the invention, various changes and modifications may be resorted to and the invention may be carried out in widely different ways and embodied in different forms, without departing from the spirit and scope thereof in its broader aspects, and I desire to cover all such modifications and embodiments coming within the scope of the appended claims.

Having thus described my invention, what I claim as new and desire to secure by Letters Patent, is:

1. A process for making compositions suitable for spinning artificial silk and the like, which comprises soaking in water animal protein selected from a group consisting of horn, hide, flesh, fish scrap, wool waste, silk waste, allowing the protein to swell in the presence of water, thereafter dissolving the swollen protein in a phenol capable of liquefaction at a temperature below the decomposition point of said protein under heat and forming a fluid solution therefrom.

2. A process for making compositions suitable for spinning artificial silk and the like, which comprises mixing animal protein selected from a group consisting of horn, hide, flesh, fish scrap, wool waste, silk waste, with water and acid of insufficient strength to decompose the protein and thereafter dissolving the protein without decomposition in a phenol capable of liquefaction at a temperature below the decomposition point of said protein and forming a fluid solution therefrom.

3. A process according to claim 2 in which the acid is salicylic acid and the phenol is concentrated phenol ($C_6H_5OH$).

4. A spinning solution suitable for producing artificial silk or the like comprising a previously swollen animal protein selected from a group consisting of horn, hide, flesh, fish scrap, wool waste, silk waste, dissolved in a phenol substantially without decomposition and of sufficient fluidity for spinning.

5. A process for making compositions suitable for spinning artificial silk and the like, which comprises dissolving a previously swollen animal protein selected from a group consisting of horn, hide, flesh, fish scrap, wool waste, or silk waste in a phenol capable of liquefaction at a temperature below the decomposition point of said protein substantially without decomposition to thereby form a fluid solution therefrom.

6. A process for making compositions suitable for spinning artificial silk and the like, which comprises dissolving a previously swollen animal protein selected from a group consisting of horn, hide, flesh, fish scrap, wool waste, or silk waste with phenol ($C_6H_5OH$) substantially without decomposition to thereby form a fluid solution therefrom.

7. A process according to claim 6 in which the material is heated at a temperature above room temperature but below 100° C.

OSKAR BORNHAUSER.

CERTIFICATE OF CORRECTION.

Patent No. 2,007,633.                                                       July 9, 1935.

OSKAR BORNHAUSER.

It is hereby certified that error appears in the printed specification of the above numbered patent requiring correction as follows: Page 2, first column, line 31, after "including" insert the words and period their homologues and derivatives.; and that the said Letters Patent should be read with this correction therein that the same may conform to the record of the case in the Patent Office.

Signed and sealed this 12th day of November, A. D. 1935.

(Seal)                                           Leslie Frazer
                                                    Acting Commissioner of Patents.